(12) United States Patent
Geier et al.

(10) Patent No.: US 9,417,114 B2
(45) Date of Patent: Aug. 16, 2016

(54) SYSTEM AND METHOD FOR DISPENSING A MEASURED AMOUNT OF A LOOSE MATERIAL

(71) Applicant: Watson Investor Communications, LLC, Noblesville, IN (US)

(72) Inventors: Eric Geier, Indianapolis, IN (US); Jim Hartman, Indianapolis, IN (US); Everett Mathis, Greenwood, IN (US); Mehul Patel, Indianapolis, IN (US); Jerry Gotway, Indianapolis, IN (US); Cheryl Watson, Noblesville, IN (US)

(73) Assignee: Watson Investor Communications, LLC, Fishers, IN (US)

( * ) Notice: Subject to any disclaimer, the term of this patent is extended or adjusted under 35 U.S.C. 154(b) by 329 days.

(21) Appl. No.: 14/053,721

(22) Filed: Oct. 15, 2013

(65) Prior Publication Data

US 2014/0053946 A1    Feb. 27, 2014

Related U.S. Application Data

(63) Continuation of application No. PCT/US2012/033489, filed on Apr. 13, 2012.

(60) Provisional application No. 61/475,723, filed on Apr. 15, 2011.

(51) Int. Cl.
*B67D 1/00* (2006.01)
*G01G 15/00* (2006.01)
*A47J 31/40* (2006.01)

(52) U.S. Cl.
CPC .............. *G01G 15/00* (2013.01); *A47J 31/404* (2013.01)

(58) Field of Classification Search
CPC ...... G01G 15/00; G01G 19/143; A47J 31/404

USPC .......... 222/56–58, 77, 240–242, 282, 283, 1; 177/25, 15; 141/83
See application file for complete search history.

(56) References Cited

U.S. PATENT DOCUMENTS 2,643,026 A   6/1953   Craig et al.
4,013,199 A   3/1977   Brown
(Continued)

FOREIGN PATENT DOCUMENTS

CN    2132703 Y    5/1993
CN    101423137 A   5/2009
(Continued)

OTHER PUBLICATIONS

Written Opinion and Search Report from PCT application No. PCT/US2012/033489 dated Nov. 1, 2012.
(Continued)

*Primary Examiner* — Lien Ngo
(74) *Attorney, Agent, or Firm* — Woodard, Emhardt, Moriarty, McNett & Henry LLP

(57) ABSTRACT

A loose material measuring and dispensing system including a container and dispenser. The tea container serves to store the tea leaves or grounds in a storage bin prior to activation of the system. Upon activation, the dispenser measures and loads a selected amount of tea into a hopper for dispensing, such as into a waiting cup or a tea infuser. The amount of tea may be selected based upon user operation of one of a number of quantity indicating/selection buttons provided in a user interface. The container is a sealed canister, such as a bag or jug, which is preferably impermeable to light. Furthermore, the dispenser is able to operate to load a desired amount of tea (e.g. by weight), specified by the user, into the hopper. Once the desired amount of tea is loaded into the hopper, the tea may be dispensed, such as into a waiting cup or infuser below.

20 Claims, 9 Drawing Sheets

(56) References Cited

U.S. PATENT DOCUMENTS

| | | | | |
|---|---|---|---|---|
| 4,195,753 | A | * | 4/1980 | Dyer .................... B65G 65/46 222/233 |
| 4,651,877 | A | | 3/1987 | Adrianus de Mooy |
| 4,665,862 | A | * | 5/1987 | Pitchford, Jr. ....... A01K 5/0291 119/51.11 |
| 4,683,812 | A | | 8/1987 | Tarlow et al. |
| 4,723,614 | A | | 2/1988 | Lahti |
| 4,867,258 | A | * | 9/1989 | Narukawa ............... G01G 13/06 141/83 |
| 5,060,558 | A | | 10/1991 | Beumer et al. |
| 5,063,757 | A | * | 11/1991 | Ikeda .................... D06F 39/026 222/236 |
| 5,241,898 | A | | 9/1993 | Newnan |
| 5,312,020 | A | * | 5/1994 | Frei ...................... G07F 13/065 222/129.1 |
| 6,056,027 | A | * | 5/2000 | Patterson ................ B65B 1/32 141/370 |
| 6,253,959 | B1 | * | 7/2001 | Gaultney ............. G01G 13/026 222/413 |
| 6,932,245 | B2 | * | 8/2005 | Whippie ............... G01F 13/005 222/181.1 |
| 8,151,693 | B2 | * | 4/2012 | Sala ...................... A47J 31/401 366/139 |
| 8,523,014 | B2 | * | 9/2013 | Sollazzo .............. G01G 13/026 141/83 |
| 8,622,257 | B2 | | 1/2014 | Erman et al. |
| 2008/0164274 | A1 | | 7/2008 | Stettes |
| 2008/0183330 | A1 | | 7/2008 | Monn |
| 2010/0199850 | A1 | | 8/2010 | Koopman et al. |

FOREIGN PATENT DOCUMENTS

| | | |
|---|---|---|
| CN | 201325740 Y | 10/2009 |
| EP | 0331271 A1 | 9/1989 |
| EP | 0 640 311 A1 | 3/1995 |
| JP | 47-24387 | 1/1972 |
| JP | 03-237941 | 10/1991 |
| JP | 03-242121 | 10/1991 |
| JP | 10-043057 | 2/1998 |
| JP | 2005-245475 | 9/2005 |
| RU | 2398283 | 6/2009 |
| WO | WO 2005/048792 A1 | 6/2005 |

OTHER PUBLICATIONS

European Search Report issued in EP 12771314.7, dated Sep. 1, 2014, 8 pgs.

* cited by examiner

SYSTEM AND METHOD FOR DISPENSING A MEASURED AMOUNT OF A LOOSE MATERIAL

CROSS REFERENCE TO RELATED APPLICATIONS

This application is a continuation of International Patent Application No. PCT/US2012/033489, filed Apr. 13, 2012 which claims the benefit of U.S. Provisional Application No. 61/475,723 filed Apr. 15, 2011, each of which is hereby incorporated by reference.

FIELD OF THE INVENTION

Aspects of the present disclosure relate to a container and dispenser for storing and dispensing loose materials, such as coffee, tea, powder, or other like materials.

BACKGROUND OF THE INVENTION

Beverages are a growing part of the restaurant industry, with many successful restaurants and/or chains selling principally beverages, such as coffee, milkshakes, smoothies, or the like. Many manufacturers provide equipment for increasing the quality and consistency of these beverages as well as to assist in shortening the point-of-sale production time required for these beverages. Despite its popularity, tea is lagging behind in its ability to be produced and sold quickly and efficiently. With the exception of water, tea is the most consumed beverage in the world. The traditional method of making a cup of tea is to place loose tea leaves, either directly or in a tea infuser, into a tea pot or teacup and pour hot water over the leaves. After a few minutes the leaves are usually removed again, either by removing the infuser, or by straining the tea while serving. Still today, this process commonly occurs by the collection and measurement of the appropriate amount of loose-leaf tea by hand. However, due to the time required, tea is often served only in more relaxed environments as its production is not conducive to rapid production.

In an attempt to expedite and/or bring convenience to the process, the tea bag was developed, which contains a predetermined amount of tea and is used to create a common sized beverage, such as 8 ounces. However, given their method of manufacture, tea bags are a lesser preferred option to fresh tea, as the tea spends quite some time in storage and transit prior to being delivered for use. Furthermore, tea bags do not lend themselves easily to the production of teas of varying quantities, such as 8 ounces, 12 ounces, or a full tea pot. Subsequently, "pods" or "cups" were developed which are used in automated machines; however, these pods suffer from the same problems as using tea bags. Accordingly, the present invention solves a number of these problems as well as other problems present in the dispensing industry, as are illustrated in the descriptions that follow.

SUMMARY OF THE INVENTION

The present invention involves various aspects of a container and/or dispenser for use in dispensing loose materials, such as dry products. Suitable dry products for use with the novel dispenser disclosed herein include tea, spices, coffee, dried foods, other powders and the like. For purposes of illustration, the container and dispenser described herein shall be described with respect to the dispensing of loose leaf tea. However, it shall be appreciated that the system could be easily applied to other loose materials, such as, but not limited to, those listed above. In one further form, the dispenser may include a coin/bill acceptor and/or credit card terminal or like device for use as a vending machine.

An illustrative embodiment of the present invention is a loose leaf tea system including a container and dispenser. The tea container serves to store the tea leaves or grounds in a storage bin prior to activation of the system. Upon activation, the dispenser measures and loads a selected amount of tea into a hopper for dispensing, such as into a waiting cup, tea pot, or a tea infuser. The amount of tea may be selected based upon user operation of one of a number of quantity indicating/selection buttons provided in a user interface or may be otherwise input by the user, such as by rotating a dial or pushing a button or lever. The container is preferably a sealed canister, such as a bag or jug, which may be stored within the dispenser so as to not expose the material contained to light, air and/or moisture. In another form, no external canister is used, rather the container is a sealed refillable housing formed within the device, so as to prevent additional waste and increase efficiency. Below the opening in the container or housing, a mechanism is provided for loading the tea into a measuring hopper below. The mechanism preferably seals when not in use so as to prevent the tea in the container from coming into contact with the outside atmosphere prior to entering the hopper below. Furthermore, the dispenser is able to operate the mechanism such that it loads a desired amount of tea (e.g. by weight), specified by the user, into the hopper. Once the desired amount of tea is loaded into the hopper, the tea may be dispensed into a desired location, such as into a waiting cup, tea pot, or infuser below.

DESCRIPTION OF THE ILLUSTRATED EMBODIMENTS

Figure 1:
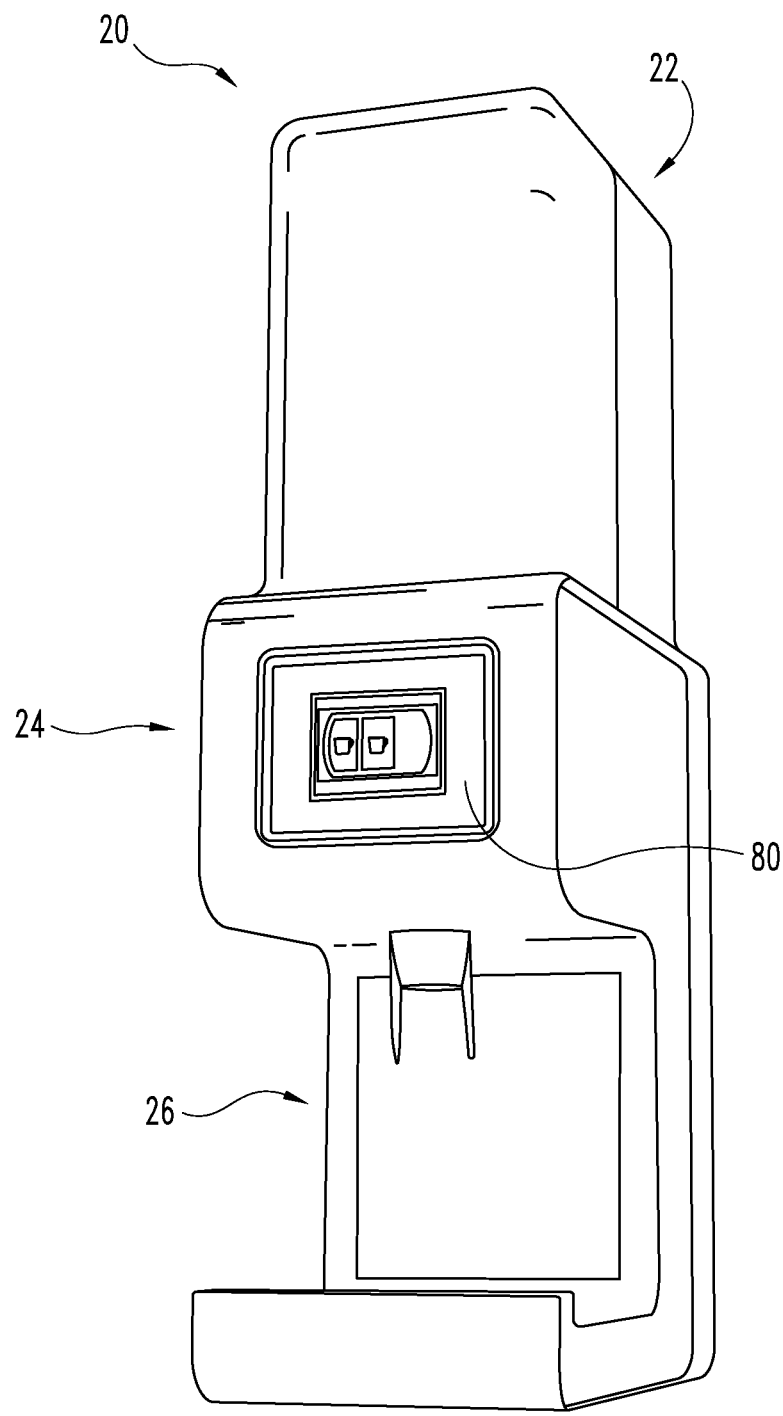
FIG. 1 is a perspective view of a tea dispenser according to one embodiment of the present invention.

For the purposes of promoting an understanding of the principles of the disclosure, reference will now be made to the embodiments illustrated in the drawings and specific language will be used to describe the same. It will nevertheless be understood that no limitation of the scope of the claims is thereby intended, such alterations and further modifications in the illustrated device, and such further applications of the principles of the disclosure as illustrated therein, being contemplated as would normally occur to one skilled in the art to which the disclosure relates.

Certain embodiments of a container and/or dispenser for use in dispensing loose materials, such as dry products will be described herein. Suitable dry products for use with the novel dispenser disclosed herein include tea, spices, coffee, dried foods, laundry detergent, other powders and the like. For purposes of illustration, the container and dispenser described herein shall be described with respect to the dispensing of loose leaf tea. However, it shall be appreciated that the container and dispenser could be easily applied to other loose materials, such as, but not limited to, those listed above. In one further form, the dispenser may include a coin/bill acceptor and/or credit card terminal or like device for use as a vending machine.

Certain embodiments of a tea dispenser and a refillable tea container are illustrated in FIG. 1. Tea dispenser 20 is illustrated in a stand alone form having an upper portion 22 for storing tea, a middle portion 24 for dispensing and measuring tea, and a bottom portion 26 providing a location for the user to place a receptacle, such as a cup, kettle, tea pot, infuser, or the like for receiving the dispensed tea. In addition, in the illustrated form tea dispenser 20 includes an electronic controller 80 which includes a user interface and controls the operation of the remaining portions of tea dispenser 20. It shall be appreciated that tea dispenser 20 may take various other forms and configurations depending upon user needs and requirements.

Figure 2:
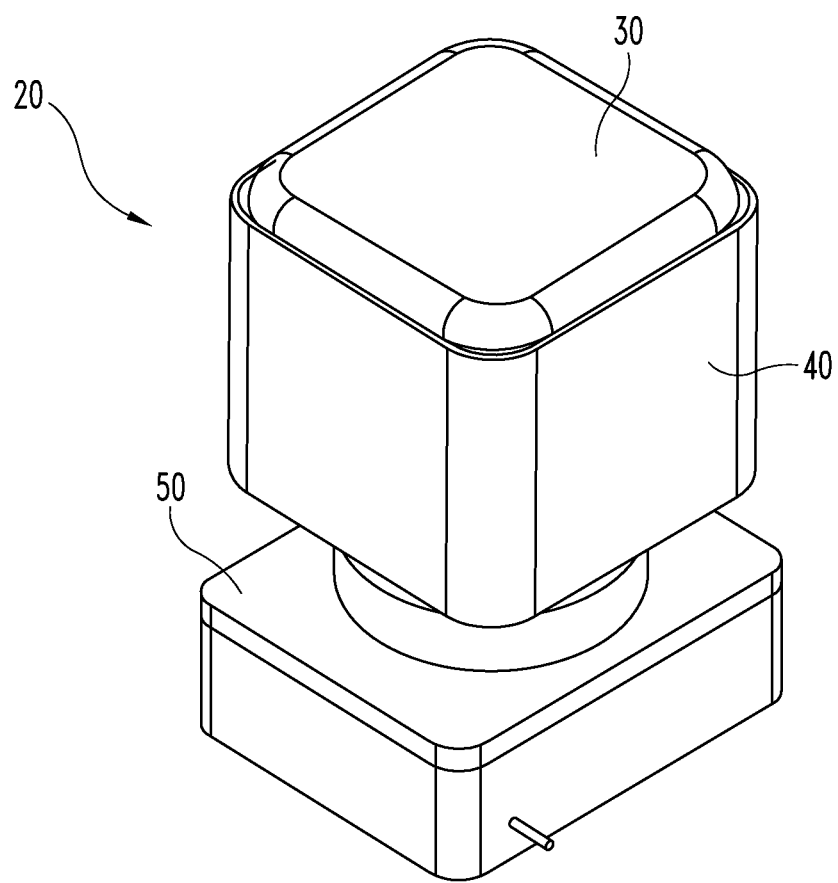
FIG. 2 is a perspective view of a tea dispenser absent its base and external housing according to one embodiment of the present invention.

Turning to FIG. 2, with continued reference to FIG. 1, an example tea dispenser 20 is shown absent its middle portion 24 and bottom portion 26 and its external housing for purposes of illustrating the internal components of upper portion 22. In the form illustrated, tea dispenser 20 includes an interchangeable tea container 30 for attachment to a receiving portion 40. In addition, tea dispenser 20 includes measuring portion 50. In alternate forms of tea dispenser 20, receiving portion 40 may include an lid, which preferably establishes an airtight seal, so that receiving portion 40 may serve the purposes of container 30 without the need for a separate container 30.

Figure 3:
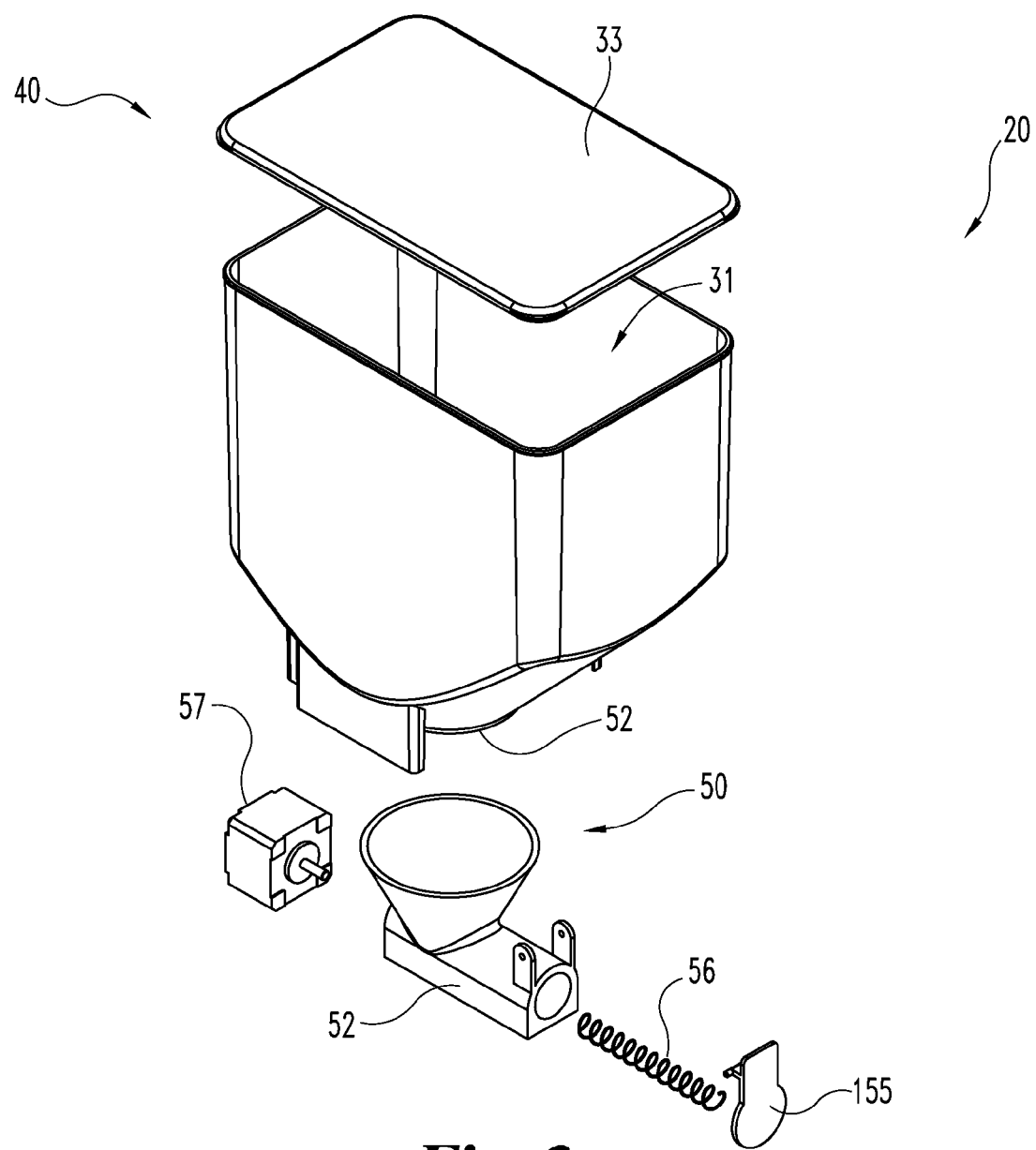
FIG. 3 is an exploded view of a portion of a tea dispenser according to one embodiment of the present invention.

Turing to FIG. 3, an exploded view is shown of a selected portion of tea dispenser 20 including receiving portion 40 and measuring portion 50 according to another form. In the embodiment illustrated, tea storage bin 31 is a hollow recess suitable for the storage of tea for subsequent dispensing formed by receiving portion 40. In the illustrated embodiment, storage bin 31 also comprises a standard lid 33 which preferably forms an air tight hermetic seal with respect to storage bin 31 to prevent the contents of storage bin 31 from coming into contact with the outside environment, thereby maintaining its freshness prior to dispensing. Measuring portion 50 mounts to the base of receiving portion 40 and serves to controllably release the contents of container 30, using the force of gravity. The dispensing is controlled by dispenser chute 52, which includes helical coil or screw 56, motor 57, and seal 155, all of which are described further herein with respect to FIGS. 6, 8 and 9.

Figure 4:
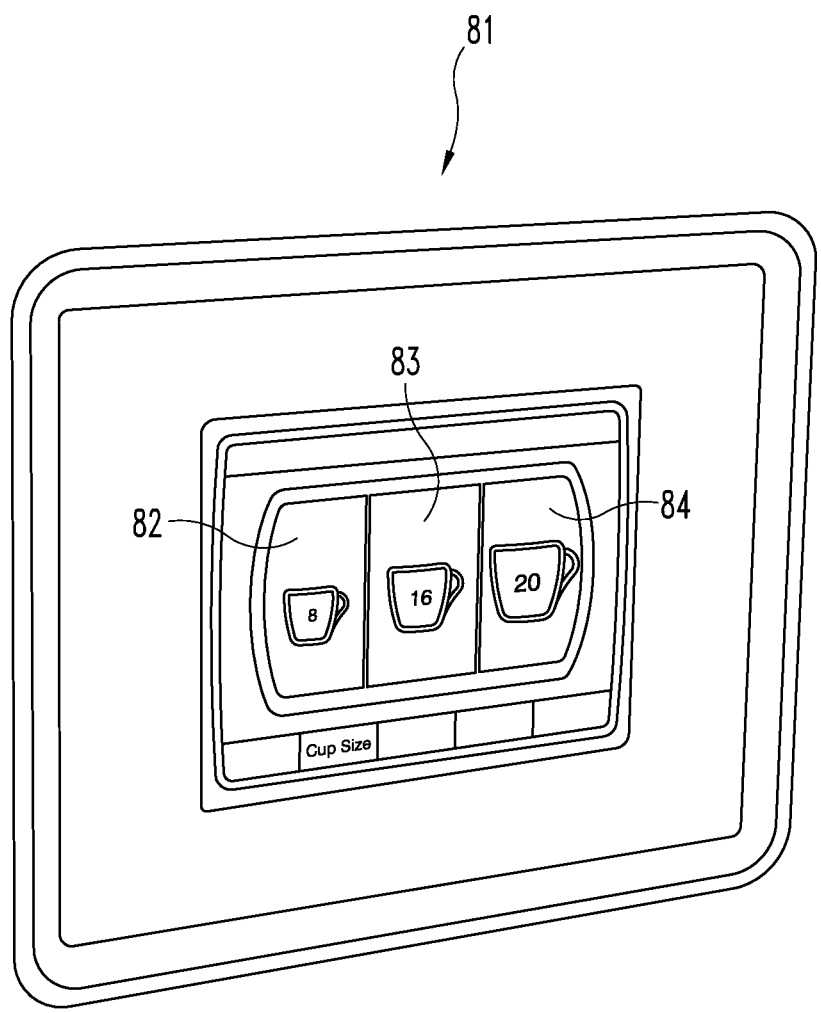
FIG. 4 is a plan view illustrating the user interface of a tea dispenser according to one embodiment of the present invention.
Figure 5:
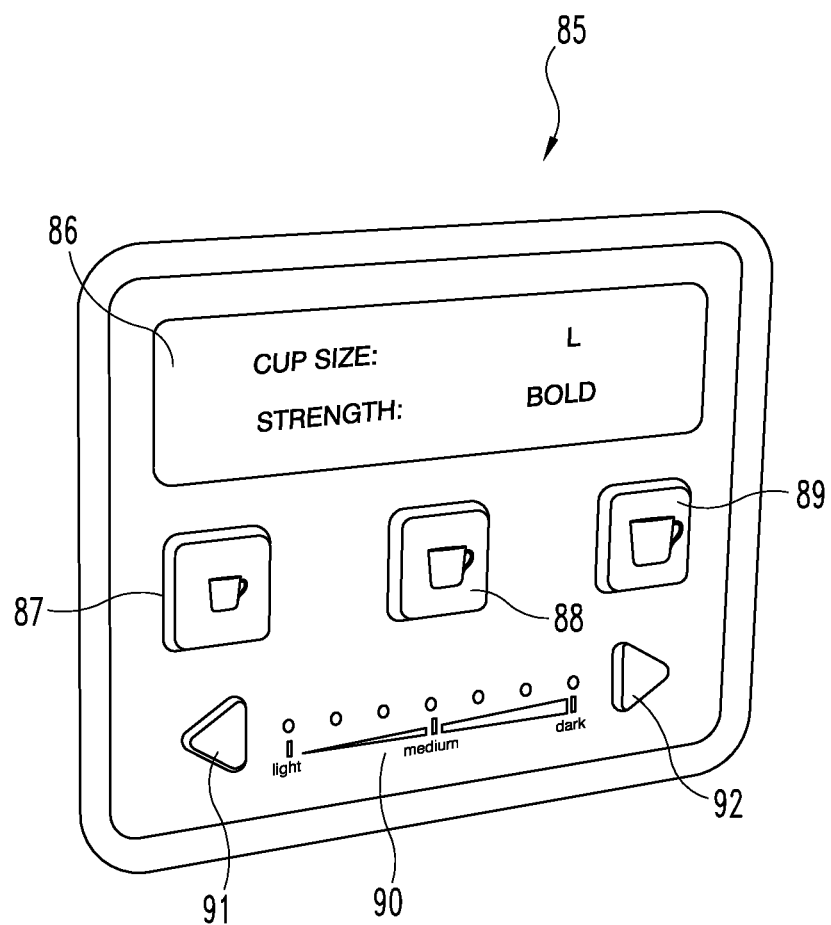
FIG. 5 is a plan view illustrating an alternate user interface of a tea dispenser according to another embodiment of the present invention.

FIGS. 4 and 5 show exemplary plan views of two user interfaces suitable for use on tea dispenser 20. It shall be appreciated that many user interface designs may be utilized without departing from the scope of the present disclosure. FIG. 4. illustrates a touch screen user interface 81 in which a number of user selectable options are provided for various sized beverages. For example, user interface 81 may include logical buttons 82, 83, and 84 which correspond to an 8 oz., 16 oz, and 20 oz. beverage respectively. Additionally, one or more of these buttons may be programmed to provide a customized size, such as 12, 18, or 20 ozs. In a further form, the size associated with these buttons may be customized by the user so as to correspond to the sizes of tea which the user prefers or which are available on the menu, such as in the case of a restaurant or tea shop. Additionally, when the user interface is provided in a touch screen, the buttons may be changed so as to show to currently programmed size, such as in ounces (or the metric equivalent), or the like. Furthermore, if desired, one or more buttons may be customized to provide for a larger volume, such as that of a tea pot.

Upon selection of button 82, internal controller 80 (shown in FIG. 1) is configured to operate tea dispenser 20 to dispense a measured amount of tea suitable for providing an 8 oz. tea beverage. Given that the amount of tea required to make a certain volume of tea is fairly standard for all types of tea (such as 2.5 g of loose leaf tea per 6 oz. of water), the user interface may remain relatively simply, if desired. Alternatively, in the case of teas which include other ingredients, such as chai tea, the weights corresponding to the various buttons may be increased accordingly depending upon the type of tea the device is currently configured for. For example, in one form user interface 81 may accept input regarding one of a number of predefined types of teas and a desired volume of tea. Based upon the currently selected tea, the amount of tea dispensed (such as by weight) for the selected volume may be different than it would have been had a different tea type been selected.

Turning to FIG. 5, an alternate, more user adjustable user interface 85 is illustrated in which a number of user selectable options are provided for various sized beverages in addition to a strength adjustment. As described above with respect to user interface 81, user interface 85 may include display 86 and buttons 87, 88, and 89 which correspond to an 8 oz., 16 oz, and 20 oz. beverage or other like amounts. Upon selection of button 87, internal controller 80 (shown in FIG. 1) is configured to operate tea dispenser 20 to dispense a measured amount of tea suitable for providing an 8 oz. tea beverage. User interface 85 also provides a secondary adjustment which allows the user to specify how strong they prefer their tea on a scale 90 from weak to strong depending on the operator's or customer's steeping preferences. When the user selects button 91 the amount of tea (by weight) dispensed is lowered to provide for a weaker tea. However, when the button 92 is selected, the amount (by weight) of tea to be dispensed in raised, providing for a stronger tea. As adjustments are made by the user, the current selection, including both beverage size and strength are indicated to the user by display 86.

Figure 6:
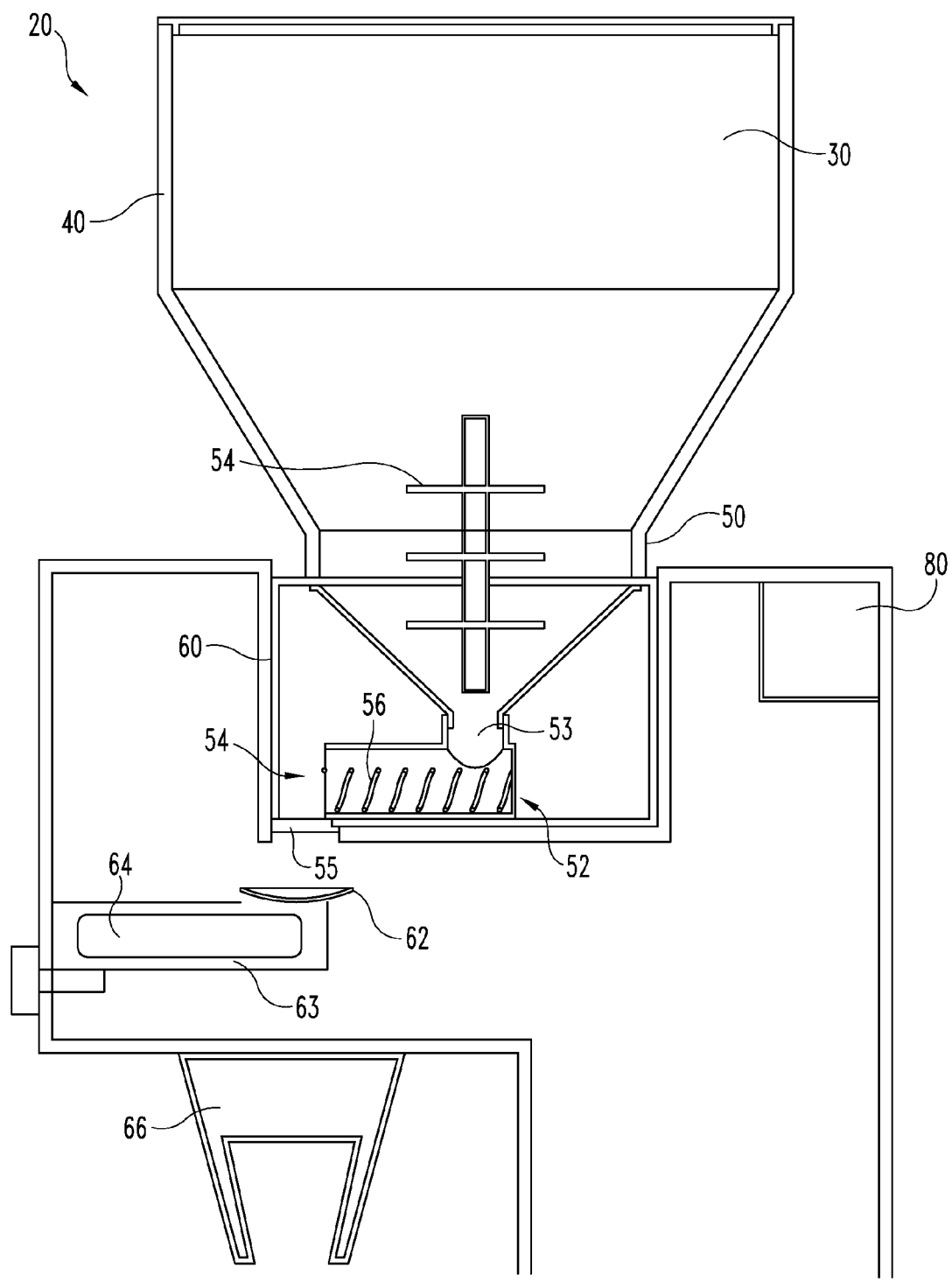
FIG. 6 is a side view of a tea dispenser absent its base and external housing according to one embodiment of the present invention.

Turning now to FIG. 6, with continued reference to FIGS. 1-5, an illustration of tea dispenser 20 having one form of measuring and dispensing mechanisms is shown from a side plan view. The bottom portion 26 and external housing of measurement portion 60 have been omitted for purposes of illustrating the internal components of tea dispenser 20. In the illustrated form, tea dispenser 20 includes container 30 for attachment to a receiving portion 40. In addition, tea dispenser 20 includes measuring portion 50 and measurement portion 60. Measurement portion 60 is shown absent its exterior housing so that the details of the inner components may be described. Measurement portion 60 includes a hopper 62 for receiving tea dispensed from dispenser chute 52 of dispensing carousel 50 under the control of controller 80.

Dispenser chute 52, according to this form, is a cylindrical chute connected to receiving portion 40 (and this container 30) at its proximal end 53. Dispenser chute 52 terminates at dispenser opening 54 at its other end. Dispenser opening 54 may also include a seal 55 which is opened only during operation in order to maintain the airtight seal of container 30, thereby protecting its contents. As shown, seal 55 may be a door which closes to establish a seal below dispenser opening 54. Between proximal end 53 and dispenser opening 54, a rotably mounted helical coil 56 is disposed within dispenser chute 52 along a portion of its length. Coil 56 may be formed of one or more pieces of wire or other suitable material or alternatively may be formed as a helical screw made of metal, plastic, or the like so as to have more fully defined vanes, which may be more beneficial when dispensing a finer powered material as opposed to a larger loose material. In a preferred form, the diameter of dispenser chute 52 is between approximately ½" and 2" and the diameter of screw 56 is between ⅜" and ½" with a pitch of between ¼" and ⅜". In a further preferred form, the diameter of dispenser chute 52 is approximately 1", and the diameter of wire which forms screw 56 is between 1/32" and 1/16".

When tea or some other material is present within container 30, it is fed into dispenser chute 52 at its proximal end 53 from receiving portion 40 by rotable member 54. When screw 56 is activated, by electronic controller 80, it begins turning in a direction which forces the material present at its end 53 toward its opposite end 54. Once the material reaches end 54 it is forced out of dispenser chute 52 and into hopper 62. Hopper 62 is mounted to one end of arm 63 which is then pivotally mounted to an internal frame of the housing of tea dispenser 20 at its opposite end. Arm 63 also includes an integrated strain gauge 64 which is suitable for electronically measuring the mass of the material dispensed by dispenser chute 52 into hopper 62 on a near-real time basis and reporting its measurements to electronic controller 80. As such, when electronic controller 80 determines that a pre-determined amount of material has been dispensed into hopper 62, the operation of screw 56 is de-activated. In a further form, screw 56 is operated by electronic controller 80 at a variable speed, such that when the amount of material still needed to be dispensed remains high, screw 56 operates at a higher speed, but when the amount of material in receptacle 62 approaches the desired amount, the speed of screw 56 may be gradually or discretely reduced so as to provide as close as possible to be desired amount of the dispensed material into receptacle 62, as will be described further below with respect to FIG. 7. Once the desired amount of tea has been dispensed into hopper 62, arm 63 is released and the contents of the hopper 62 and dumped into funnel 66, which guides the contents of hopper 62 out of the middle portion 24 and down into the designated area when a waiting container is positioned in the bottom portion 26.

Figure 7:
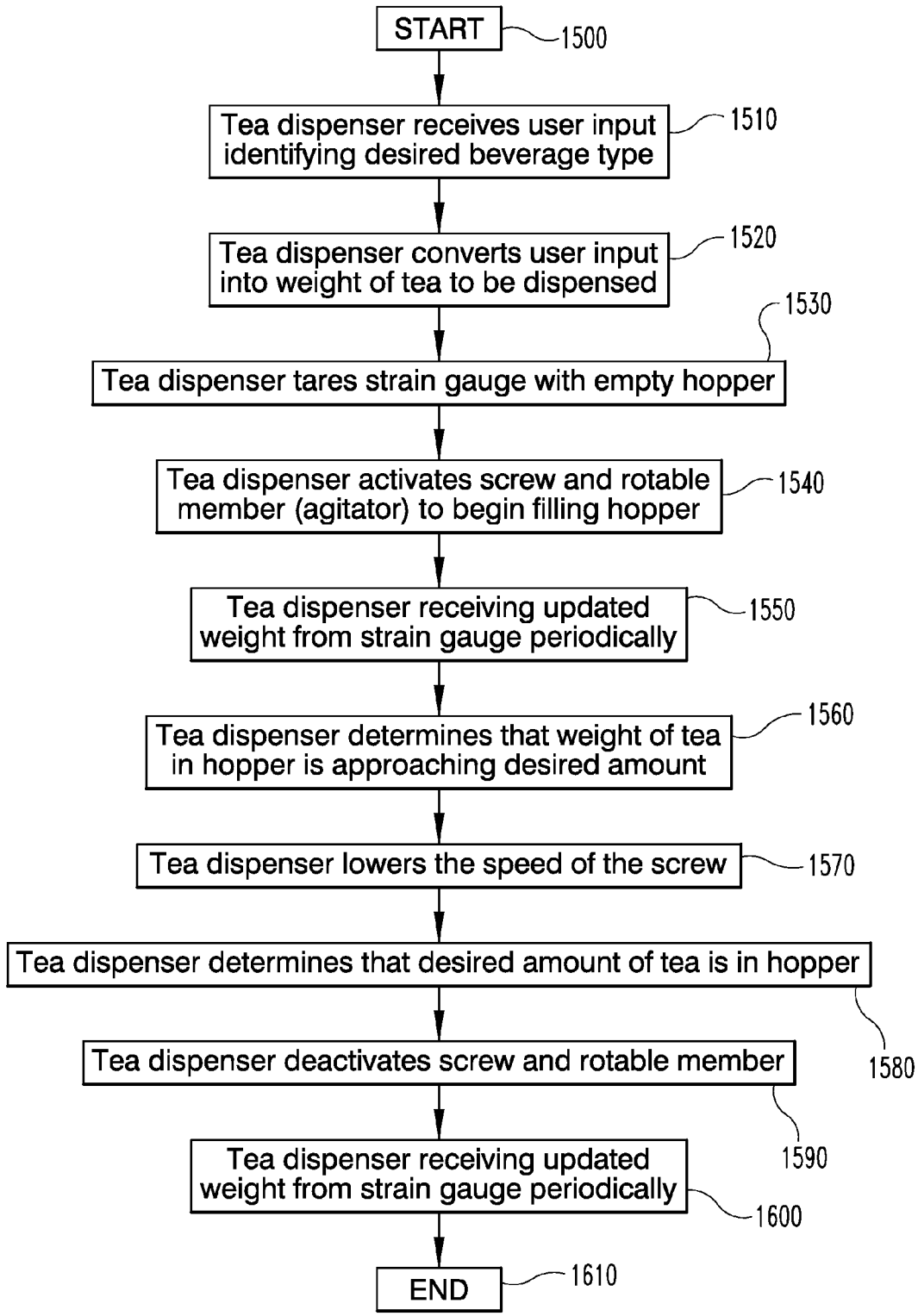
FIG. 7 is a flowchart illustrating a process which controls the operation of the tea dispenser of any of FIGS. 1-6 in accordance with one form of the present invention.

FIG. 7 illustrates a flowchart which, along with continued reference to FIGS. 1-6, shows a beverage selection and dispensing process in accordance with one form of the present invention, which will be used to illustrate the manner in which tea dispenser of FIG. 1 may operate. Process 1500 begins with step 1510 in which the user activates the tea dispenser 22 by providing input sufficient to enable the dispenser to identify the amount of tea to be dispensed. For illustrative purposes, as shown in FIGS. 4 and 5, this may include an indication input into a user interface, such as user interface 81 or 85, that the user desires an 8 oz. tea, or that the user desires a 16 oz. tea made either slightly stronger or weaker than normal. The process proceeds to step 1520 in which the electronic controller 80 of tea dispenser 20 receives the user input and determines the proper amount of tea (in weight) to be dispensed. The electronic controller 80 then begins to dispense the tea by calibrating the value perceived by strain gauge 64 to zero in order to accurately measure the amount of tea added to the hopper 62 in step 1530. The electronic controller 80 then enables the motor(s) which drives rotary member 54 and screw 56 in step 1540. Shortly thereafter, tea from container 30 begins to accumulate in hopper 62. As this occurs, strain gauge 64 begins periodically reporting a value indicating the weight of the tea dispensed into hopper 62 to electronic controller 80 in step 1550. Once the electronic controller determines that the weight of tea dispensed into receptacle 62 is approaching a predetermined percentage of the amount to be dispensed (step 1560), electronic controller lowers the speed of the motor which drives screw 56, thereby decreasing the rate of dispensing (step 1570). Once the electronic controller 80 determines that the desired weight of tea has been dispensed into hopper 62 (step 1580), the electronic controller 80 deactivates the motor(s) which drives rotary member 54 and screw 56 in step 1590, and releases the mechanism which holds arm 63, thereby dumping the contents of hopper 62 down and into funnel 66 and ultimately into the user's waiting container (step 1600). In a further form, a sensor is required to sense a receptacle, such as a cup or the like, in the dispensing area prior to the tea dispenser 22 being operable to dispenser the tea in step 1600. The process ends at step 1610.

It shall be appreciated by one of skill in the art that many of the steps may occur simultaneously or in various order, with varying time intervals between steps also being possible. In a further form, the electronic controller 80 may perform more than one speed adjustment in order to quickly dispense tea up to a certain percentage of the desired amount and then go through several speed reductions in order to accurately and quickly arrive at the desired weight.

Figure 8:
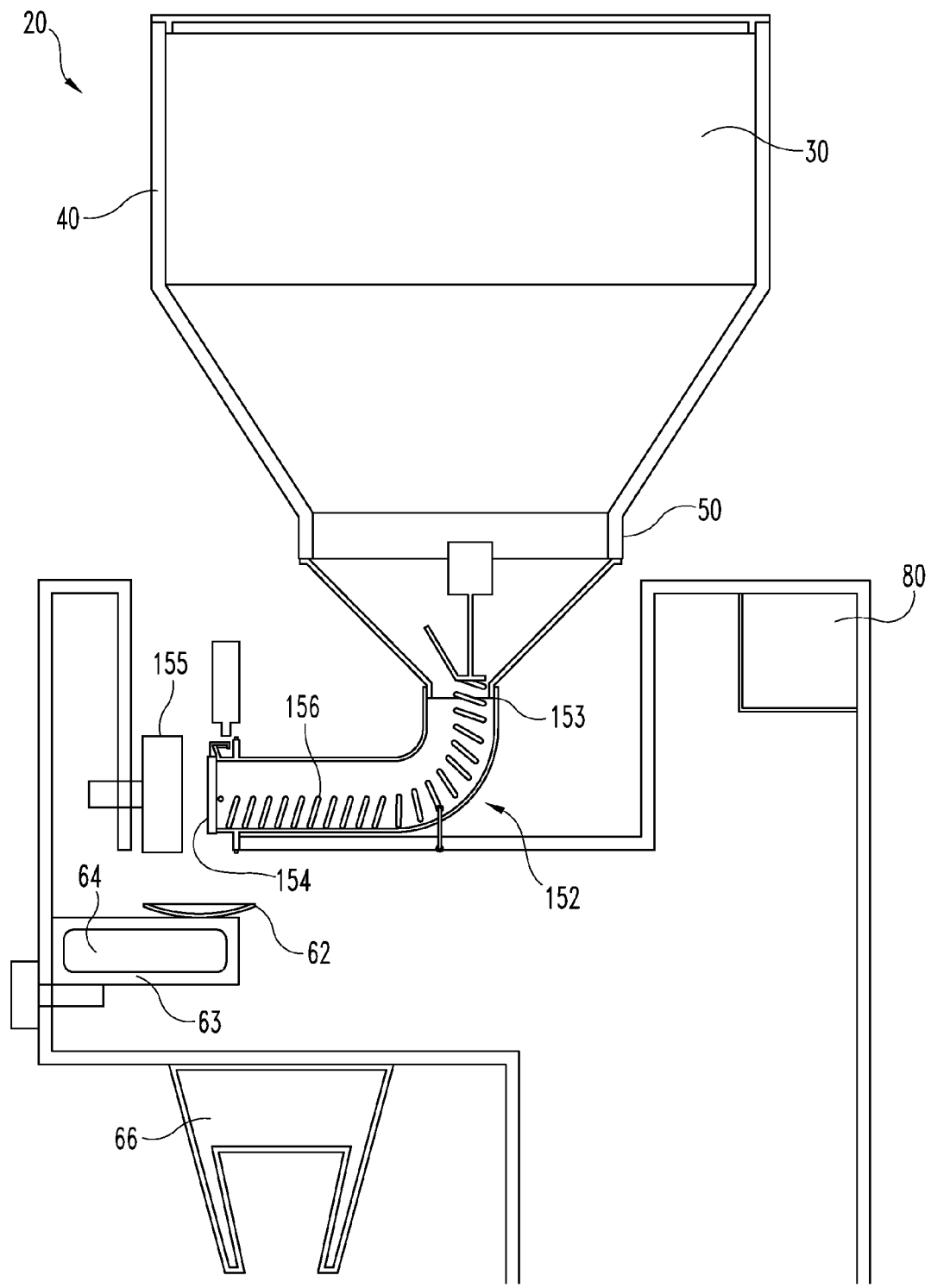
FIG. 8 is a side view of a tea dispenser absent its base and external housing according to another embodiment of the present invention.

Turning now to FIG. 8, with continued reference to FIGS. 1-5, an illustration of tea dispenser 20 having another form of measuring and dispensing mechanisms is shown from a side plan view. Common elements of tea dispenser 20 shall be referred to herein using the same numerals. The bottom portion 26 and external housing of measurement portion 60 have similarly been omitted for purposes of illustrating the internal components of tea dispenser 20. In this form, dispenser chute 152, is a cylindrical elbow shaped chute connected to receiving portion 40 (and this container 30) at its proximal end 153. Dispenser chute 152 terminates at dispenser opening 154 at its other end. Dispenser opening 154 may also include a seal 155 which is opened only during operation in order to maintain the airtight seal of container 30, thereby protecting its contents. As shown, seal 155 is a cap which covers and surrounds dispenser opening 154 to establish a seal. Between proximal end 153 and dispenser opening 154, a rotably mounted helical coil 156 is disposed within dispenser chute 152 along a portion of its length. Coil 156 may be formed of one or more pieces of wire or other suitable material or alternatively may be formed as a helical screw made of metal, plastic, or the like so as to have more fully defined vanes, which may be more beneficial when dispensing a finer powered material as opposed to a larger loose material. In a preferred form, the diameter of dispenser chute 152 is between approximately ½" and 2" and the diameter of screw 56 is between ⅜" and ½" with a pitch of between ¼" and ⅜". In a further preferred form, the diameter of dispenser chute 52 is approximately 1", and the diameter of wire which forms screw 56 is between 1/32" and 1/16".

Figure 9:
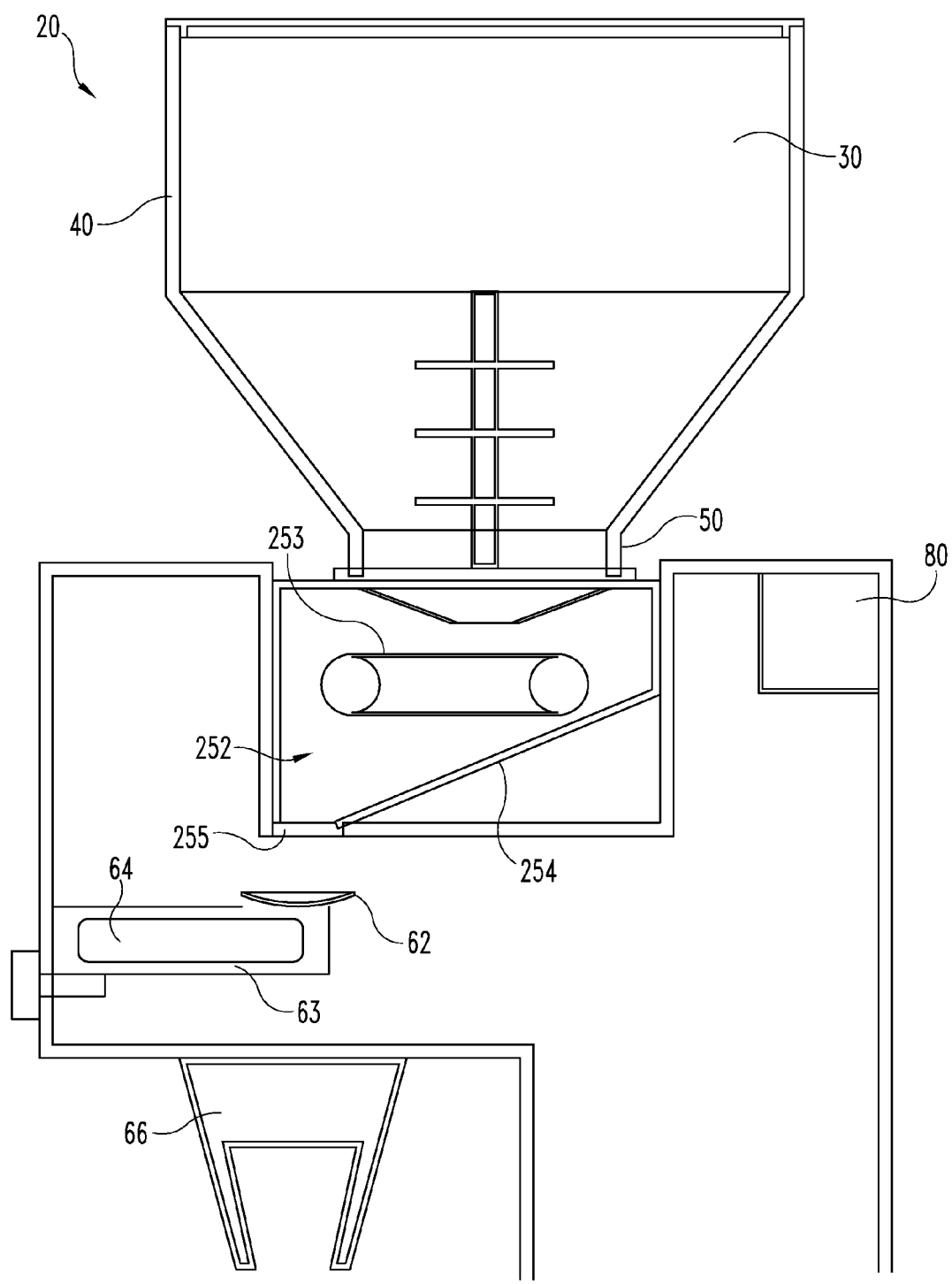
FIG. 9 is a side view of a tea dispenser absent its base and external housing according to yet another embodiment of the present invention.

Turning now to FIG. 9, with continued reference to FIGS. 1-5, an illustration of tea dispenser 20 having yet another form of measuring and dispensing mechanisms is shown from a side plan view. Common elements of tea dispenser 20 shall again be referred to herein using the same numerals. The bottom portion 26 and external housing of measurement portion 60 have similarly been omitted for purposes of illustrating the internal components of tea dispenser 20. In this form, dispenser chute 252 is formed by an electrically controlled conveyor 253 which collects material from the bottom opening of container 30 located directly above it and delivers it to a sloped surface 254 which leads the material, via the force of gravity, through trap door 255 and into receptacle 62. Trap door 255 preferably forms an air-tight seal which is opened only during operation in order to maintain the airtight seal of container 30, thereby protecting its contents. As shown, seal 55 is a door which closes to establish a seal below dispenser opening 54.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the claims so as to encompass all such modifications as well as all relationships equivalent to those illustrated in the drawings and described in the specification.

What is claimed is:

1. A bulk material dispenser operable to dispense a selected amount of loose material comprising:
   an exterior housing defining a receptacle location suitable for the placement of a receptacle into which the loose material is to be dispensed, wherein said exterior housing includes an outlet opening positioned above said receptacle location:
   a sealed housing for storing said loose material;
   a user interface mounted to said exterior housing;
   an electronic controller for receiving a user selection identifying a desired amount of loose material to be dispensed via said user interface; and
   a measuring mechanism positioned below said sealed housing and above said outlet opening, comprising:
      a bin mounted to a scale so as to provide the weight of the material currently contained therein to said electronic controller, and upon activation by said electronic controller, release the material contained therein through said outlet opening;
      a material chute, having an inlet in sealed fluid communication with the interior of said sealed housing and an outlet positioned so as to dispense material into said bin;
      a rotatable screw powered by a motor connected to said electronic controller, wherein said rotatable screw is located within said material chute so as to provide controllable dispensing of the material into said bin; and
      a sealing cap adapted to mechanically seal the outlet of said material chute when said rotatable screw is not in operation.

2. The bulk material dispenser of claim 1, wherein said sealed housing is hermetically sealed.

3. The bulk material dispenser of claim 1, wherein said material chute has an elbow shape.

4. The bulk material dispenser of claim 2, wherein said electronic controller and said measuring mechanism are located within said exterior housing.

5. The bulk material dispenser of claim 4, wherein said sealed housing includes an agitator which operates during at least a portion of the operation of said material chute.

6. The bulk material dispenser of claim 1, wherein said loose material is tea leaves.

7. The bulk material dispenser of claim 6, wherein said user interface allows for adjustments to specify the volume of tea to be prepared.

8. The bulk material dispenser of claim 7, wherein said user interface allows for user selection of the type of tea being dispensed and stores two different weights for a selected quantity of tea to be prepared in association with each of two selected tea types.

9. A method of dispensing a user selected amount of loose tea using a dispenser comprising:
   receiving a first user input via a user interface located on said dispenser, wherein said user input identifies a desired amount of tea;
   receiving a second user input via said user interface, wherein said second input adjusts said desired amount of tea upward or downward by a predetermined amount;
   receiving a weight from a scale having a bin mounted thereto;
   transferring tea from a sealed container into said bin until said weight received from said scale meets or exceeds said desired amount; and
   sealing the tea remaining in the sealed container from outside air; and
   dispensing said tea from said bin through an outlet opening in said dispenser.

10. The method of claim 9, wherein said second user input provides for a stronger or weaker tea.

11. The method of claim 9, wherein said second user input adjusts the volume of tea desired up or down.

12. The method of claim 9, further comprising the step of:
   resealing said sealed container after said transferring.

13. A bulk material dispenser operable to dispense a selected amount of loose material comprising:
   an exterior housing defining a receptacle location suitable for the placement of a receptacle into which the loose material is to be dispensed, wherein said exterior housing includes an outlet opening positioned above said receptacle location:
   a sealed housing for storing said loose material;
   a user interface mounted to said exterior housing;
   an electronic controller for receiving a user selection identifying a desired amount of loose material to be dispensed via said user interface; and
   a measuring mechanism positioned below said sealed housing and above said outlet opening, comprising:
      a bin mounted to a scale so as to provide the weight of the material currently contained therein to said electronic controller, and upon activation by said electronic controller, release the material contained therein through said outlet opening;
      a controlled outlet in fluid communication with said housing, wherein said controlled outlet is adapted to dispense loose material from said housing when activated by said electronic controller;
      a belt-type conveyor powered by a motor connected to said electronic controller, wherein said conveyor is mounted below said controlled outlet and configured to receive loose material from said controlled outlet and dispense the material into said bin and said controlled outlet is adapted to be mechanically sealed by a seal when said conveyor is not in use.

14. The bulk material dispenser of claim 13, wherein said sealed housing includes an agitator which operates during at least a portion of the operation of said controlled outlet.

15. The bulk material dispenser of claim 13, wherein said loose material is tea leaves.

16. The bulk material dispenser of claim 15, wherein said user interface allows for adjustments to specify the number of ounces of tea to be prepared.

17. The bulk material dispenser of claim 15, wherein said user interface is adapted to receive user input specifying the type of tea contained within said housing.

18. The bulk material dispenser of claim 17 wherein said user interface allows for user selection of the type of tea being dispensed and stores two different weights for a selected quantity of tea to be prepared in association with each of two selected tea types.

19. The bulk material dispenser of claim 13, wherein said controlled outlet forms a hermetic seal of said container when not activated by said electronic controller.

20. A bulk material dispenser operable to dispense a predetermined amount of loose material upon activation by a user comprising:

an exterior housing defining a receptacle location suitable for the placement of a receptacle into which the loose material is to be dispensed, wherein said exterior housing includes an outlet opening positioned above said receptacle location:

a sealed housing for storing said loose material;
a user interface mounted to said exterior housing capable of receiving use input regarding
a first predetermined amount of loose material and storing it in association with a first user selectable button;
a measuring mechanism positioned below said sealed housing and above said outlet opening, comprising:
a bin mounted to a scale so as to provide the weight of the material currently contained therein to said electronic controller, and upon activation by said electronic controller, release the material contained therein through said outlet opening; and
a controlled outlet in fluid communication with said housing, wherein said controlled outlet is adapted to continuously dispense loose material from said housing when activated by said electronic controller; and said controlled outlet is adapted to be mechanically sealed by a seal when said controlled outlet is not used; and
an electronic controller for receiving a user selection of said first button via said user interface and in response activating said measuring mechanism to dispense said first predetermined amount of loose material.

* * * * *